Feb. 14, 1939.   J. K. GRZYBOWSKI   2,146,817
FISH SNARE
Filed July 2, 1937
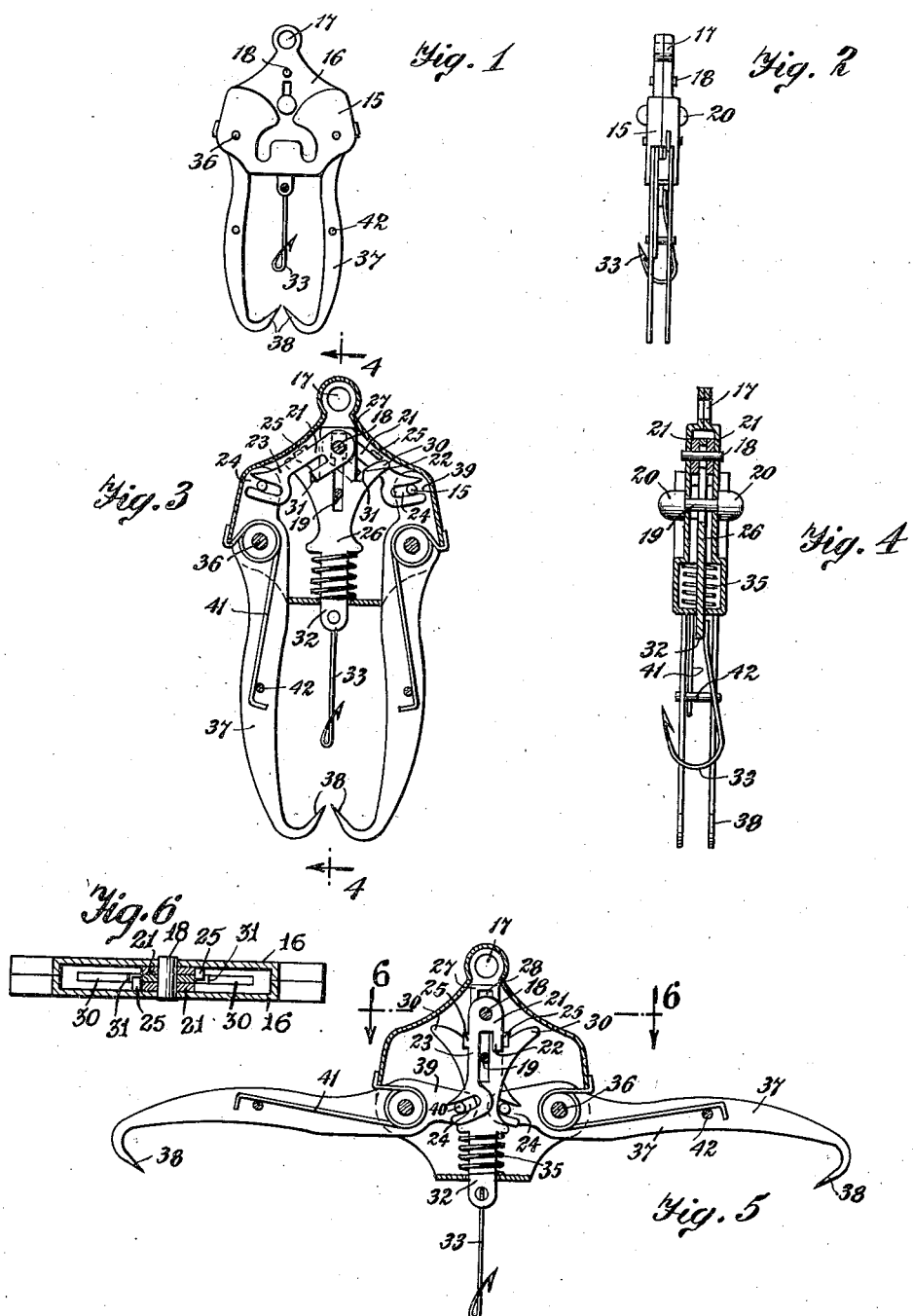
INVENTOR.
JOWITA K. GRZYBOWSKI
BY Marvin _____
ATTORNEY.

Patented Feb. 14, 1939

2,146,817

UNITED STATES PATENT OFFICE 2,146,817

FISH SNARE

Jowita K. Grzybowski, Chicago, Ill.

Application July 2, 1937, Serial No. 151,614

3 Claims. (Cl. 43—89)

This invention relates to devices for catching fish and like piscatorial animals which are lured by bait on a barbed hook attached to a fishing line.

An object of the invention is to provide an effective means to impale the fish, when sufficiently attracted by the lure to pull slightly on the hook.

A further feature is in the provision of pairs of opposed, spring actuated prongs adapted to forcibly grasp a fish coincidentally with the merest tension on the hook.

Another purpose is to produce a fish snaring device of the aforesaid nature, capable of efficient use without previous experience, and which may be set without difficulty an unlimited number of times.

These objects are accomplished by the novel construction and combination of parts hereinafter described and illustrated in the accompanying drawing, forming a material part of this disclosure, and in which:

Figure 1 is a side elevational view of an embodiment of the invention.

Figure 2 is an edge view of the same.

Figure 3 is a longitudinal sectional view, taken substantially on the center line, drawn to an enlarged scale and showing the pronged jaws in closed position.

Figure 4 is a sectional view taken on line 4—4 of Fig. 3.

Figure 5 is a view similar to Figure 3, but showing the pronged jaws in open position.

Figure 6 is a cross-sectional view taken on the line 6—6 of Figure 5.

Referring in greater detail to the drawing, the apparatus will be seen to consist of a casing, generally denoted by the numeral 15, a flat rectangle in cross section having depressed sides 16, terminating at the top in a closed eye 17 to which may be attached a cord or line, not shown; preferably the casing is constructed of two opposed equal parts as indicated.

Passing through the upper central portion of the casing sides is a pin 18, below which is another fixed pin 19, having enlarged heads 20 at its ends to retain the casing sides in juxtaposition.

Pivoted on the pin 18 are a pair of opposed levers 21, their shorter arms 22 having square stub ends and their longer arms 23 terminating in broad pads containing slots 24. These levers are also provided with inreaching detent lugs 25 for a purpose further on apparent.

Intermediate the lever 21 is a flat plate 26 having a central raised portion 27 containing a slot 28, its wider, upper part being guided by the pin 18, while its narrower lower portion is guided by the pin 19 used to secure the casing sides.

Extending angularly outward from the opposite edges of the plate 26 are a pair of horns 30 having sharp angular recesses 31 in the upper edges to receive the lugs 25, when the apparatus is set, as best seen in Figure 5.

The lower portion of the plate 26 is extended, as at 32, to pass through the bottom of the casing 15, and attached to this extension is a barbed fish-hook 33 reaching therebelow.

A compression spring 35 is coiled around the plate extension 32, tending to press it upwardly and normally confining the detent in the recesses of the plate.

Fixed in the side walls of the casing, near its outer edges, are a pair of pins 36 on which are pivoted two pairs of levers 37, their outwardly extending arms terminating in inturned sharp prongs 38 and their inner ends 39 shaped to seat against the inner walls of the casing.

The inner ends of each pair are connected by pins 40 engaged in the slots 24 of the lever at all times. The levers 37, when released by movement of the levers 21, are impelled inwardly towards each other by reason of springs 41, coiled around the pins 36, one end of the springs abutting the exterior of the casing 15, and the other ends engaging pins 42 connecting the levers 37 in paired relation.

In operation the spring carrying levers 37 are spread as in Figure 5, until the detents 25 engage in the plate recesses 31 and are held in such raised position until the plate 26 has been drawn downwardly, as by a fish nibbling at the bait attached to the hook 33, causing the plate to move against the effect of the spring 35, sufficiently to release the detents whereupon the springs 41 operate to force the prongs 38 towards each other, impaling from both sides, whatever may be at the bait.

As changes of construction could be made within the scope of the invention, it is intended that all matter contained in the foregoing description or shown in the accompanying drawing shall be interpreted as illustrative and not in a limiting sense.

Having thus described the invention, what is claimed as new and desired to secure by Letters Patent, is:

1. In a fish snare, a casing having line attaching means, a slide movable in said casing and having a hook carried at its extending end, resilient means to press said slide upwardly in said casing, detent levers engageable by said slide when in raised position, a pair of opposed pronged levers pivoted in said casing, springs, urging said pronged levers, towards each other, connections between said detent levers and pronged levers whereby said pronged levers are normally held inoperative, and means to release said detent levers upon exerting a pull on said hook.

2. In a fish snare, a casing having line attaching means, a slide movable vertically in said casing, resilient means to raise said slide, a pair of levers having detents engaged by said slide when in a raised position, a second pair of levers having inreaching prongs, said last named levers being pivoted in the casing and spring impelled inwardly, and an operative connection between the first and second named levers whereby the latter are released when the detent of the first named levers are freed from said slide.

3. In a fish snare, a casing, a pair of levers pivoted on a common axis therein and provided with detents, a pair of pronged levers pivoted on opposed relation and in spaced axes in said casing, resilient means to force said pronged levers towards each other, connections between the detent levers and pronged levers whereby the latter may be retained inoperative, a slide cooperative with the detents on the first named levers, a hook carried by said slide, said slide being normally spring raised, and means to release the detents upon downward movement of said hook, whereby said pronged levers are released to move inwardly.

JOWITA K. GRZYBOWSKI.